United States Patent [19]

Furuhashi et al.

[11] 3,760,095

[45] Sept. 18, 1973

[54] COLOR SUB-CARRIER REFERENCE SYSTEM FOR A COLOR TELEVISION RECEIVER

[75] Inventors: Michio Furuhashi, Katano-shi, Osaka-fu; Teruo Kitani, Takatsuki-shi, Osaka-fu; Reiichi Sasaki, Hirakata-shi, Osaka-fu, all of Japan

[73] Assignee: Matsushita Electric Industrial Co., Ltd., Osaka, Japan

[22] Filed: May 18, 1972

[21] Appl. No.: 254,650

[30] Foreign Application Priority Data

Aug. 11, 1971 Japan ............................... 46/60805
Aug. 11, 1971 Japan ............................... 46/60806

[52] U.S. Cl. ............................................ 178/5.4 SY
[51] Int. Cl. ............................................ H04n 9/46
[58] Field of Search .................... 178/5.4 R, 5.4 SY, 178/5.4 SD, 5.4 P, 69.5 CD

[56] References Cited

UNITED STATES PATENTS

| | | | |
|---|---|---|---|
| 2,848,537 | 8/1958 | Richman | 178/5.4 SY |
| 3,559,092 | 1/1971 | Roth | 178/5.4 SY |
| 3,659,040 | 4/1972 | Fujita | 178/5.4 SY |

*Primary Examiner*—Richard Murray
*Attorney*—E. F. Wenderoth et al.

[57] ABSTRACT

A color sub-carrier reference system for a color television receiver which makes possible the elimination of a conventional phase shift means connected between the subcarrier regenerator and the chroma demodulator. The system comprises a signal generating means which is controlled according to the information on frequency and phase contained in the burst signal. The signal generating means produces signals having an opposite polarity and the second harmonic or double the frequency of the sub-carrier, and feeds these signals to first and second bistable flip-flops which divide the frequency of the input signals by two, respectively. The first flip-flop produces the R-Y reference signal for R-Y chroma demodulation and the second flip-flop produces the B-Y reference signal for B-Y demodulation.

8 Claims, 18 Drawing Figures

PATENTED SEP 18 1973 3,760,095

SHEET 1 OF 5

FIG. 2A
FIG. 2B
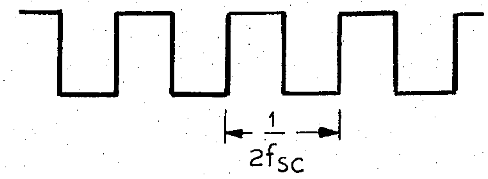
FIG. 2C, FIG. 2D
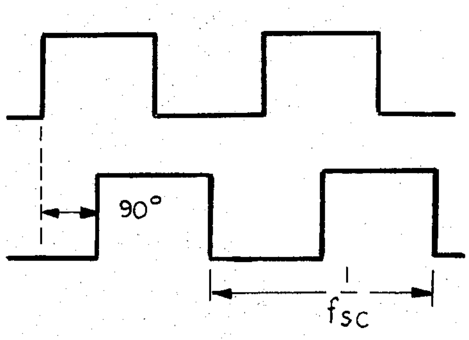
FIG. 3A
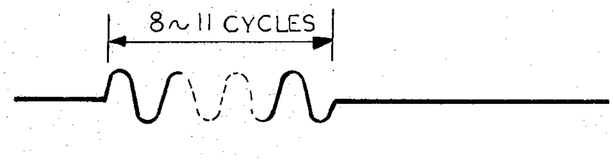
FIG. 3B1
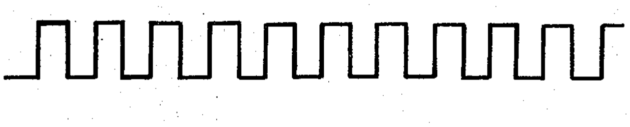
FIG. 3C1
FIG. 3B2
FIG. 3C2, FIG. 3D
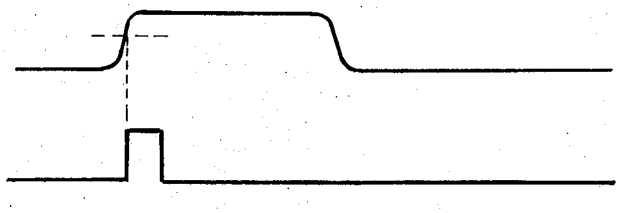

FIG. 5A, FIG. 5B1, FIG. 5B2, FIG. 5C1, FIG. 5C2

COLOR SUB-CARRIER REFERENCE SYSTEM FOR A COLOR TELEVISION RECEIVER

FIELD OF THE INVENTION

This invention relates to a color sub-carrier reference system, and more particularly relates to a color sub-carrier reference system for use in a color television receiver. Still more particularly, this invention relates to a color sub-carrier regenerator using digital circuits or digital integrated circuits.

DESCRIPTION OF THE PRIOR ART

A color television receiver capable of receiving signals transmitted by the NTSC (National Television System Committee) transmission system comprises the following basic devices for reproduction of the transmitted color information: chroma amplifiers for selecting and amplifying the modulated color sub-carrier, chroma demodulators for detecting the information contained in the phase and amplitude of the modulated color sub-carrier, and a sub-carrier regenerator for providing the required reference signal to the chroma demodulators wherein color difference signals are obtained from the suppressed carrier signal.

There are three systems for regeneration of the reference signal used at present in color television receivers: (1) a voltage controlled crystal oscillator in an automatic phase control (APC) loop; (2) an injection locked crystal oscillator, and (3) a narrow band-pass crystal filter. The APC loop is capable of providing a much greater phase accuracy than the other systems for a given noise bandwidth and detuning, but it requires a phase detector and a voltage controlled variable capacitance device for controlling frequency. The other two systems do not need such a configuration, and therefore they are more economical than the APC loop. However, generally these systems perform rather poorly. Because complex circuit configurations can be made in the form of a monolithic integrated circuit (IC) without increasing the cost, the APC system is used more than the other systems.

Recently, the circuits of the chroma processors of color television receivers have been converted from tubes or discrete solid-state circuits to linear integrated circuits. Transistors and resistors can be fabricated on one monolithic chip, but it is not feasible to integrate other electronic components, such as inductors, transformers and capacitors, into a monolithic package. Therefore, frequency selecting circuits or tuning circuits have not been included in the integrated circuits. In the conventional chroma processor using integrated circuits, a sub-carrier regenerating IC is coupled to a chroma demodulating IC through a phase shift means which is not formed as part of the integrated circuits. It is obvious that as the replacement of the discrete circuits with integrated devices increases, the economic advantage over the discrete circuits increases. At the present, because some of the discrete circuits are not integrated on a monolithic chip, the fabrication cost of color television circuits cannot be reduced in this area.

Therefore, it would be desirable to include more discrete circuits in an integrated device, or to design a novel system for eliminating the discrete circuits.

SUMMARY OF THE INVENTION

It is an object of this invention to provide a new color sub-carrier reference system for use in a color television receiver in which the necessity for providing a discrete phase shift circuit between the reference regenerator and the chroma demodulator and the necessity for adjusting such a circuit for the required phase shifting can be eliminated so that more advanced designs for color sub-carrier reference systems with improved reliability become possible at a low cost.

It is another object of this invention to provide a new color sub-carrier reference system using digital integrated circuits which will provide further cost/performance advantages as compared to linear integrated circuits.

To achieve the foregoing objects, the present invention provides a color sub-carrier reference system in which a signal generating means for providing signals having polarities opposite to each other and the second harmonic or double the frequency of the sub-carrier has coupled thereto a first flip-flop means which is driven by the first output signal of said signal generating means, and which provides first reference signal to a first chroma demodulating means. A second flip-flop means is also coupled to said signal generating means and is driven by a second output signal having the opposite phase to that of said first output signal, and which provides second reference signal to a second chroma demodulating means.

DESCRIPTION OF THE DRAWING

These and other features of the invention will be apparent from the following description of the invention, taken in connection with the accompanying drawings, in which:

FIGS. 2A–2D and 3A–3D are graphs illustrating various waveforms for explaining the operation of the system of the invention shown in FIG. 1;

DESCRIPTION OF PREFERRED EMBODIMENTS

In the subsequent description, this invention will be described in relation to a color sub-carrier reference system for use in a color television receiver.

Figure 1:
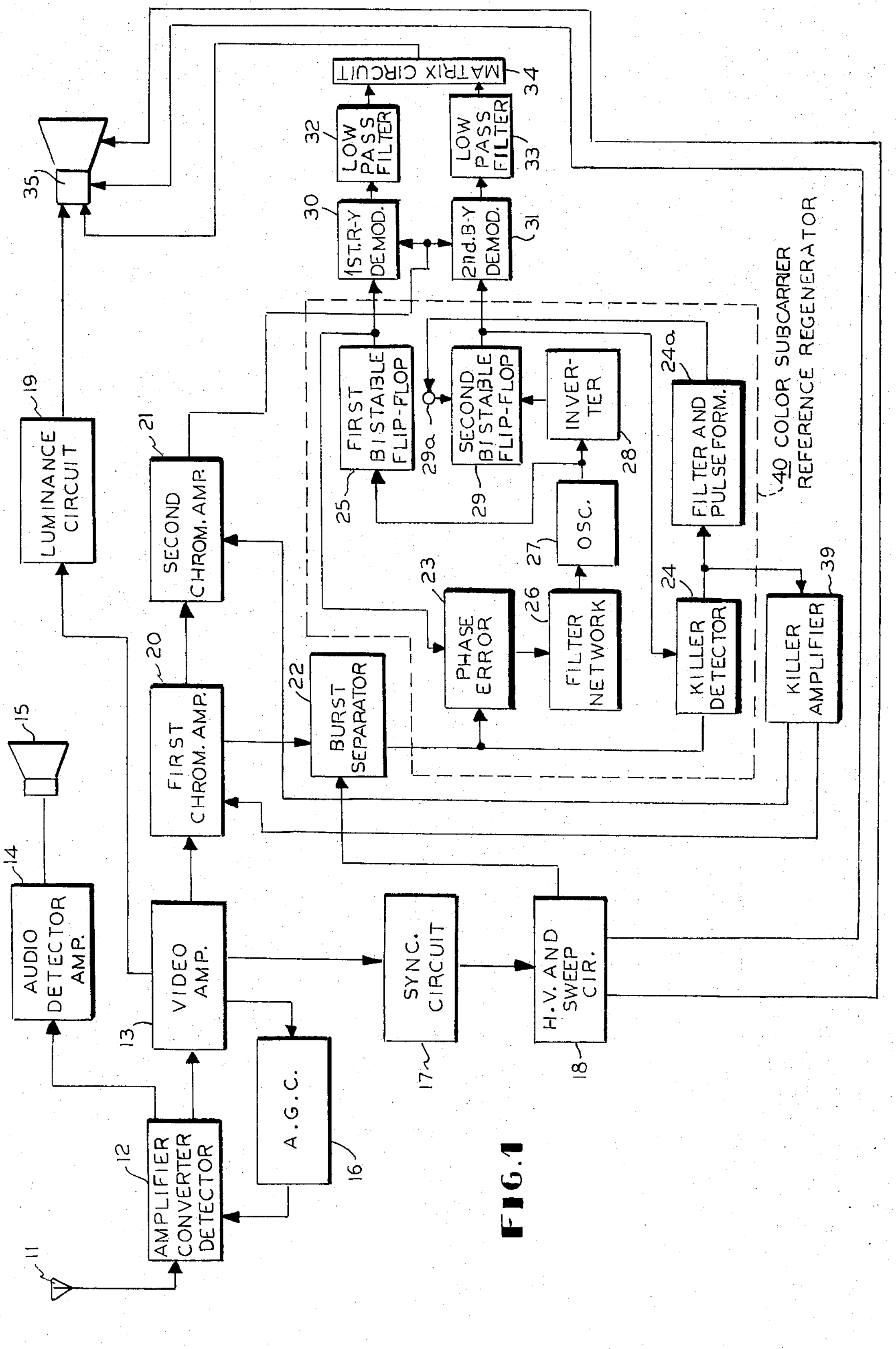
FIG. 1 is a block diagram of a color television receiver incorporating one embodiment of this invention.

FIG. 1 is a block diagram of a color television receiver for use with the NTSC transmission system, incorporating one embodiment of the sub-carrier reference system of the present invention. The overall operation of the receiver shown in FIG. 1 is conventional, and will be briefly described. The color sub-carrier reference system according to this invention will then be described in greater detail.

An antenna 11 is connected to the input of a stage 12 which amplifies the received composite color television radio frequency (RF) signal, converts it to an intermediate frequency (IF) signal, amplifies that intermediate frequency signal, and then detects the amplitude modulated waveform of the intermediate frequency signal so as to recover the video signal. That video signal is applied to a video amplifier stage 13 and is amplified thereby. A second output from the stage 12 is applied to an audio stage 14 which detects and amplifies the frequency modulated signal of the intermediate frequency signal so as to recover the sound signal and applies the sound signal to a sound reproducer or speaker 15. A first output from the video amplifier 13 is applied to an automatic gain control circuit 16 which is, in turn, coupled to the stage 12 for varying the gain of that stage so as to compensate for variations in the amplitude of the received signal. A second output from the video amplifier 13 is applied, in turn, to a synchronizing circuit 17 which recovers the synchronizing signal from the received video signal. The signal from the synchronizing circuit 17 is applied to a high voltage and sweep circuit 18, which develops the required deflection signals and high voltages and applies them to deflection yokes and an accelerating electrode in a picture tube 35, respectively. A third output from the video amplifier 13 is applied to a luminance circuit 19 which applies the required luminance signal to the electron gun of the picture tube 35. A fourth output from the video amplifier 13 is connected to a first chrominance amplifier 20.

The first chrominance amplifier 20, the gain of which is controlled by an automatic chrominance control (ACC) signal, delivers at its output a modulated chrominance signal. A first output from the first chrominance amplifier 20 is coupled through a burst separator 22 to an input of a color sub-carrier reference regenerator 40 of this invention, the parts of which are enclosed within the dotted line in FIG. 1. A second output from the first chrominance amplifier 20 is applied to a second chrominance amplifier 21 and amplified thereby. The second chrominance amplifier 21 is switched in the absence of burst so as to provide a color killing action. The second chrominance amplifier is connected to first and second demodulators 30 and 31 which in turn are connected to a matrix circuit 34 through low pass filters 32 and 33, the matrix circuit being connected to the picture tube 35. First and second chrominance amplifiers 20 and 21 have connected thereto the outputs of a killer amplifier stage 39.

Turning now to the sub-carrier reference regenerator 40, the first output from the first chrominance amplifier 20 is applied to a burst separator 22 which is keyed by a horizontal pulse signal supplied from the high voltage and sweep circuit 18 and develops at its output the color burst signal. Outputs from said burst separator 22 are coupled to a phase error detecting means 23 and a killer detector 24. Said phase error detecting means 23 measures the phase difference between the burst signal and a first reference signal supplied from a first bistable flip-flop 25, and provides a control signal through filter network 26 to a voltage controlled crystal oscillator 27 so as to maintain the reference signal in the proper phase relationship to the burst signal. Said voltage controlled crystal oscillator 27 is connected to the first bistable flip-flop 25 and through inverter 28 to second bistable flip-flop 29 for providing first and second reference signals to the first and second demodulators 30 and 31, respectively. The frequency of oscillation of said voltage controlled crystal oscillator 27 is locked in the second harmonic or double frequency of the subcarrier, so that sub-carrier reference signals are obtained by the bistable flip-flops 25 and 29 which divide the frequency of their inputs by two. The output of said second bistable flip-flop 29 is connected to the killer detector 24, the output of which is connected to the killer amplifier stage 39 and through a filter and pulse-forming means 24 *a* to the second bistable flip-flop 29.

Referring to FIGS. 2A–2D which are graphs illustrating the waveforms obtained by various parts shown in the block diagram of FIG. 1, the waveform of FIG. 2A represents the output signal of the voltage controlled crystal oscillator 27 having a frequency $2f_{sc}$ and the waveform of FIG. 2B is the output signal of the inverter 28, the phase of which is opposite to that of FIG. 2A. The waveforms of FIGS. 2C and 2D represent output signals to the flip-flops 25 and 29 which are triggered by signals having the waveforms of FIGS. 2A and 2B, respectively. If the waveforms of FIGS. 2A and 2B have a duty factor of 0.5, the input signal to the flip-flop 29 is 180° out of phase with the input signal to the flip-flop 25. Therefore, the phase difference between the output signals of the flip-flops 25 and 29 is 90°. When the output of the flip-flop 25 is coupled to the phase error detecting means 23 for providing an APC loop, it is locked at approximately 90° out of phase with the burst signal. Therefore, the output signal of the flip-flop 25 can be used for a reference signal required for R-Y chroma demodulation, and the output signal of the flip-flop 29 can be used for B-Y chroma demodulation. Thus, first and second reference signals obtained by the flip-flops 25 and 29, respectively, are directly applied to the R-Y and B-Y demodulators 30 and 31 without having to be put through any phase shift means. Having been provided with the proper inputs of the two reference signals and the modulated chrominance signal from the second chrominance amplifier 21, the demodulators 30 and 31 provide two color-difference signals through low pass filters 32 and 33 to matrix circuit 34, whereby R-Y and G-Y and B-Y color difference signals are obtained.

The output signal from the flip-flop 29 is also supplied to the killer detector 24 which provides a control signal for ACC and killer actions. A first output signal from said killer detector 24 is supplied to ACC and killer amplifier stage 39 which amplifies the detected signal and converts it to ACC and killer control signals. These control signals are supplied to the first and second chrominance amplifiers 20 and 21. A second output signal from the killer detector 24 is supplied to a filter and pulse-forming means 24a for providing a reset signal for the flip-flop 29 so as to maintain the output signal of the flip-flop 29 in the proper phase relationship such as the B-Y axis or 180° with respect to the burst signal. The filter and pulse-forming means 24*a* provides filtering of carrier harmonics from the detected signal and generates a pulse signal when the phase error is detected. This error detection is accomplished by detecting the amplitude level or polarity of the detected signal, as shown in FIGS. 3A–3D.

Referring to FIGS. 3A–3D, a waveform as shown in FIG. 3A represents a burst signal of approximately 8 to 11 cycles of sinusoidal waveform and the waveform in FIG. $3B_1$ is a reference signal obtained from the flip-flop 29, which is 180° out of phase with the burst signal or waveform of FIG. 3A. The waveform of FIG. $3C_1$ represents the detected burst signal which is produced by the reference signal of FIG. $3B_1$, while the waveform of FIG. $3C_2$ is produced by the reference signal of FIG. $3B_2$ which is in-phase with respect to the burst signal. The phase of the reference signal obtained by the flip-flop 29 is restricted to 0° or 180° with respect to the burst signal, because the input signal to the flip-flop 29 is locked by the APC loop. Therefore, the output signal of the killer detector 24, which is a synchronous detector, has information in the form of a negative or positive going pulse, as shown by the waveform of FIGS. $3C_1$ and $3C_2$, depending on the phase of the reference signal, i.e. whether it is 0° or 180° with respect to the burst signal. Therefore, a reset signal, as shown by a waveform of FIG. 3D, is produced by the filter and pulse-forming means 24a when it detects a positive going pulse such as the waveform of FIG. $3C_2$, assuming that the faulty phase is 0° or in-phase with respect to the burst signal. The output signal from the filter and pulse-forming means 24a is applied to a reset terminal 29a of the bistable flip-flop 29 for maintaining the reference signal obtained by the flip-flop 29 in the required phase relationship to the burst signal.

Thus, R-Y and B-Y reference signals are obtained by the flip-flops 25 and 29 in the sub-carrier reference regenerator 40 of the present invention, without using a conventional phase shift network when the duty factor of the output signal obtained by the oscillator is one-half. However, since the duty factor is not necessarily one-half because of tolerances in parameters of devices or components forming the regenerator 40, the sub-carrier reference regenerator of FIG. 1 will need a little adjustment of the pulse width of the output signal of the oscillator or input signals of flip-flops 25 and 29.

Figure 4:
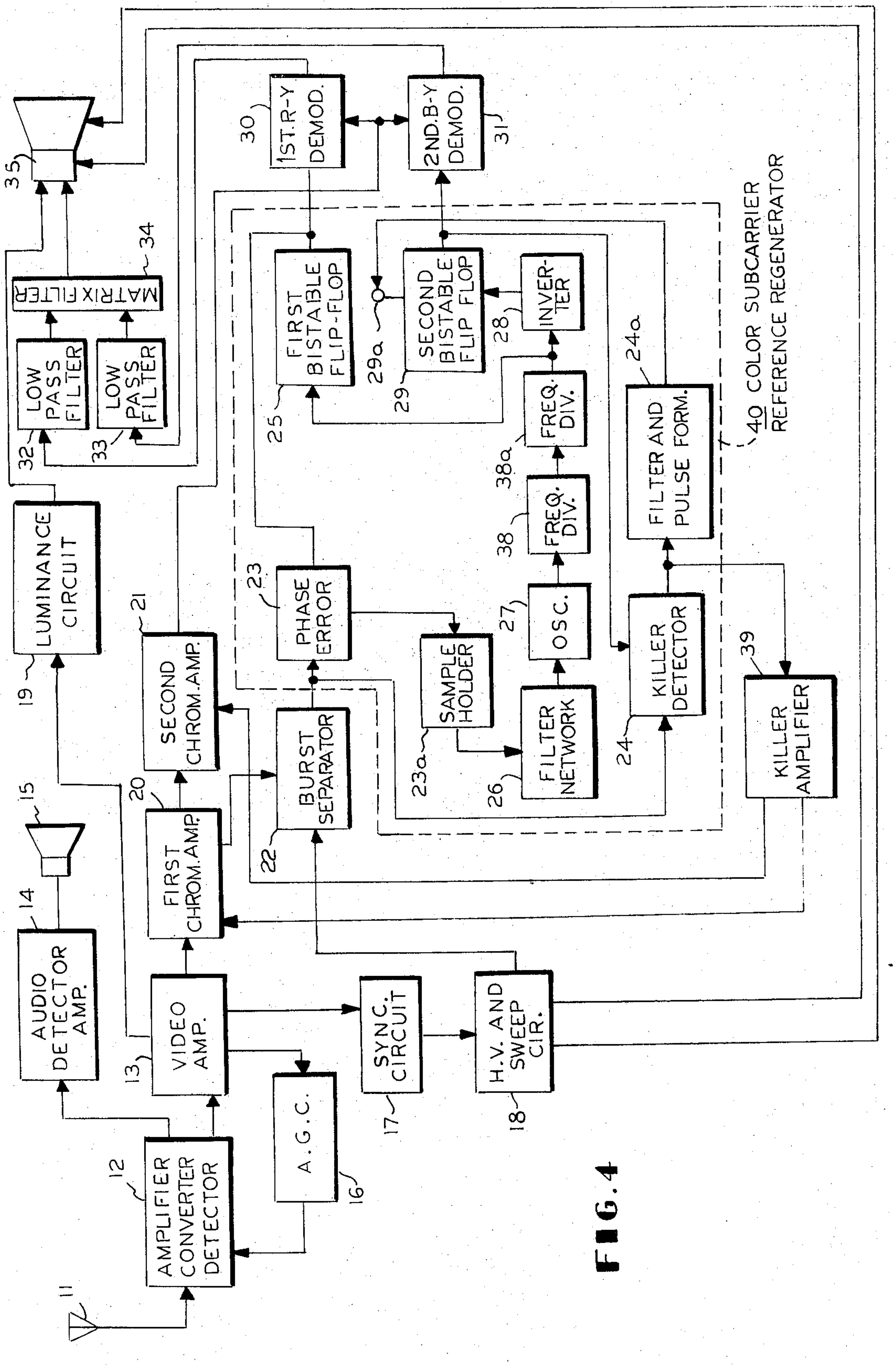
FIG. 4 is a block diagram of a color television receiver incorporating another embodiment of this invention.

FIG. 4 shows another embodiment of the subcarrier reference system of this invention in which the need for such an adjustment is eliminated. The means for handling the audio signal, the luminance signal, the chrominance signal and the synchronizing information are identical to that in FIG. 1. The circuitry in FIG. 4 differs from that in FIG. 1 in that (a) voltage controlled oscillator 27 oscillates at a frequency of $4N f_{sc}$, where $f_{sc}$ designates the sub-carrier frequency and N is an integer, and is followed by frequency divider 38 which divides the frequency of the input signal by N and a third bistable flip-flop 38a for obtaining a rectangular waveform having the second harmonic or double the frequency of the sub-carrier and a duty factor of one-half and (b) in that a sample holder 23a is provided between phase error detector 23 and filter network 26.

As the burst signal only exists during a short interval corresponding to the duty factor of about the 0.04 times interval of line scanning, the average values of detected burst signal per one cycle of the horizontal scanning is 0.04 times the amplitude values of the detected burst, and may be not large enough for controlling the voltage controlled crystal oscillator 27. Therefore, the sample-holder 23a, which retains the amplitude voltage of a detected burst signal during a line scan interval, is provided between the phase detector 23 and the filter network 26.

Figure 5:
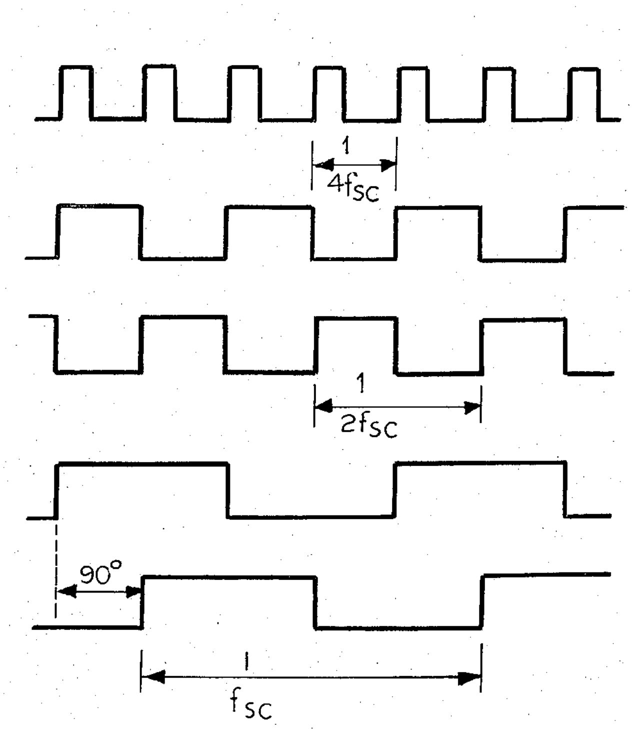
FIGS. 5A–$5C_2$ are graphs illustrating waveforms for explaining the operation of the system of FIG. 4.

FIGS. $5A$–$5C_2$ show waveforms for explaining the signals obtained by the oscillator 27, third bistable flip-flop 38a, and first and second flip-flops 25 and 29, under the condition where N = 1. The waveform of FIG. 5A represents the output signal of oscillator 27 which oscillates at the 4th harmonic or four times the frequency of the sub-carrier and has an arbitrary duty factor which is greater than 0 and less than 1. The waveform of FIG. $B_1$, which has a duty factor of one-half with the second harmonic or double the frequency of the sub-carrier is the output signal of the third flip-flop 38a. Frequency divider 38 is not necessary where N = 1. The waveform of FIG. $C_1$ represents the output signal of the first flip-flop 25 as triggered by the waveform of FIG. $5B_1$, and the waveform of FIG. $5C_2$ is the output signal of the second flip-flop 29 as triggered by the waveform of FIG. $5B_2$, the phase of which is opposite to the phase of $B_1$. Since the input signal to the flip-flop 29 is 180° out of phase with the input signal to the flip-flop 25, as shown by the waveforms of FIGS. $5B_1$ and $5B_2$, the output signal of the flip-flop 29 is in quadrature with that delivered from the flip-flop 25.

Figure 6:
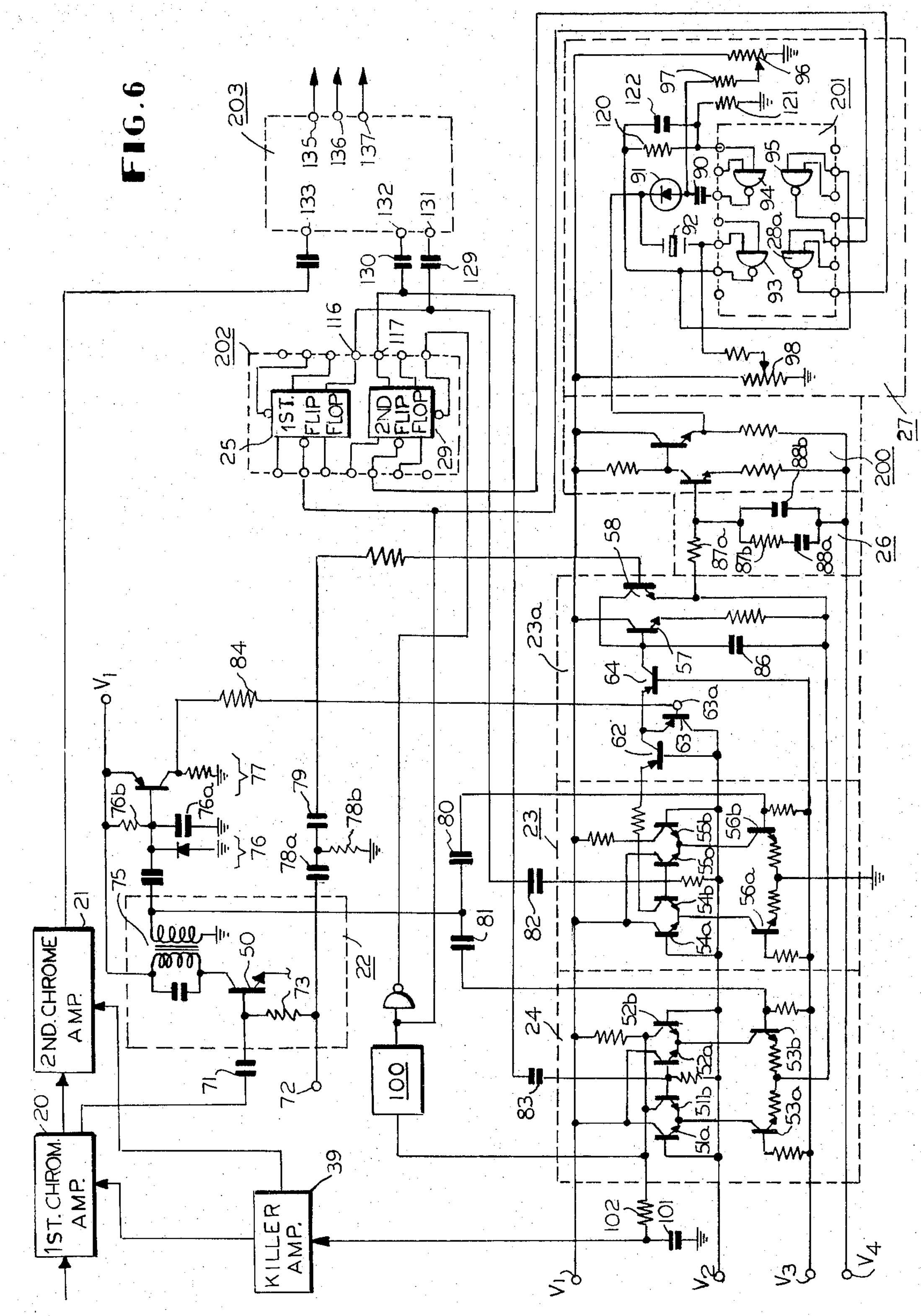
FIG. 6 is a schematic circuit diagram of a color sub-carrier reference system according to this invention.

Referring to FIG. 6, there is shown a schematic circuit diagram of a color sub-carrier reference system intended for use as a part of integrated chroma processing circuits in color television receivers, which is a practical embodiment according to the principles of the present invention. In FIG. 6, the blocks identical with those of FIGS. 1 or 4 are indicated by identical reference numerals. A chrominance signal delivered from the first chrominance amplifier 20 is supplied to the base electrode of transistor 50 through a capacitor 71. Transistor 50 and its associated components function as the burst separator 22 which is keyed by a horizontal pulse signal applied to an input terminal 72 and then to the base electrode of transistor 50 through a resistor 73. The burst signal delivered from the secondary winding of transformer 75, the first winding of which is coupled to the collector electrode of transistor 50, is supplied to phase detector 23 and killer detector 24 through capacitors 80 and 81, respectively. Phase detector 23, comprising transistors 54a and 54b, 55a and 55b, and 56a and 56b connected in the form of a double balanced differential amplifier, measures the phase difference between said burst signal and the output signal of the flip-flop 25 supplied theeto through capacitor 82.

The output signal of the phase detector 23 is applied to emitter electrode and transferred to collector electrode of transistor 62 of sample-holder 23a, the collector electrode of transistor 62 being coupled to emitter electrodes of transistors 63 and 74. The collector current of transistor 62 flows from emitter to collector electrodes of transistor 63 until a sampling pulse is supplied through resistor 84 to base electrode 63a through pulse amplifier 77. When a sampling pulse is applied, transistor 63 is cut off, and the collector current of transistor 62 is switched to flow from emitter to collector electrodes of transistor 64. Thus, the output signal of the phase detector 23 is sampled by the sampling pulse and charges capacitor 86 connected between the collector electrode of transistor 64 and ground. The voltage across capacitor 86 is applied through an emitter follower comprising transistor 57 to filter network 26 comprising resistors 87a and 87b and capacitors 88a and 88b. The discharge of capacitor 86 is accomplished by supplying a reset pulse to the base electrode of transistor 58, the collector and emitter electrodes of which are in parallel with capacitor 86. If a sampling pulse is supplied at the time coinciding with the burst signal, and a reset pulse is supplied at the end of a line scan interval, the voltage across capacitor 86 is held at a value proportional to the peak amplitude of the detected burst signals during a line scan interval.

In the embodiment of FIG. 6, the sampling and reset pulses are obtained from the burst and horizontal signals as follows. The burst signal separated by the burst separator is also coupled to envelope detector 76 which acts as a half wave receiver with a capacitance-input filter consisting of capacitor 76a and resistor 76b, and develops at its output a negative envelope signal of the burst. The output signal from said envelope detector 76 is amplified and converted to a positive going pulse by said pulse amplifier 77. Thus, the sampling pulse is supplied through resistor 84 to transistor 63 at a time coinciding with the burst signal. A horizontal pulse supplied to an input terminal 72 for keying said burst separator 22 is differentiated by capacitor 78*a* and resistor 78*b* and converted to a pulse train consisting of a series of positive and negative spikes. Only the positive spikes of the series are applied through diode 79 to transistor 58 for providing a reset action for said sample-holder 23*a*.

The output voltage of sample-holder 23*a* is smoothed by filter network 26 and thereafter supplied to a buffer amplifier 200 which develops at its output a control signal for the voltage controlled crystal oscillator 27. Said voltage controlled crystal oscillator 27 comprises coupling capacitor 90, voltage controlled capacitance diode 91, 7.16 MHz crystal 92 resonating at the second harmonic or double the frequency of the sub-carrier, gate circuit 93, coupling network consisting of resistors 120 and 121 and capacitor 122, and gate circuit 94 which are, in turn, connected in series for providing a positive feedback loop. The center arm of potentiometer 96 which is connected between power source $V_1$ and ground is used for adjusting the frequency of oscillation and is coupled through resistor 97 to the junction of said coupling capacitor 90 and voltage controlled capacitance diode 91. The center arm of potentiometer 98, which is connected between power source $V_1$ and ground, is used for adjusting the pulse width of oscillating waveform and is coupled through a resistor to the junction of said crystal 92 and gate circuit 93.

The output signal having a rectangular waveform of the second harmonic or double the frequency of sub-carrier is delivered from gate circuit 93 and supplied to a buffer gate circuit 95. The output signal from gate circuit 95 is supplied to first flip-flop 25 and also to the second flip-flop 29 through gate circuit 28a which acts as a phase inverter.

Gate circuits 93, 94, 95 and 28a, and flip-flops 25 and 29 are contained in TTL digital integrated circuits 201 and 202, respectively. Flip-flops 25 and 29 act as the one-half divider of frequency and develop at their output terminals 116 and 117 sub-carrier reference signals. The output signal from the flip-flop 25 is applied through coupling capacitor 129 to R-Y reference input terminal 131 of integrated chroma demodulating circuit 203 and is also supplied through coupling capacitor 82 to the base electrodes of transistors 54b and 55a in said phase detector 23. The output signal from the flip-flop 29 is supplied through coupling capacitor 130 to B-Y reference input terminal 132 of said integrated chroma demodulating circuit 203 and is also supplied through coupling capacitor 83 to the killer detector 24 which is a synchronous detector comprising transistors 51a and 51*b*, 52*a* and 52*b*, and 53*a* and 53*b*, and their associated resistors. The output signal from the killer detector 24 is supplied through a low pass filter composed of capacitor 101 and resistor 102 to the ACC and killer amplifier 39. One output signal of the ACC and killer amplifier 39 is supplied to the first chrominance amplifier 20 for an ACC action and another output signal is supplied to the second chrominance amplifier 21 for a killer action. The output signal of the killer detector is also supplied to a reset terminal 29*a* of the flip-flop 29 through pulse-forming means 100, such as a Schmitt trigger circuit, which develops at its output a pulse signal when the phase of output signal obtained from the flip-flop 29 is opposite to that required for B-Y demodulation.

In an integrated chroma demodulating circuit 203 provided with the inputs consisting of the modulated chrominance signal supplied to input terminal 133 thereof and reference signals obtained from the flip-flops 25 and 29, three color difference signals (R-Y, G-Y and B-Y signals), respectively, are provided at its output terminals 135, 136 and 137.

Thus, the present invention provides an inductorless sub-carrier reference regenerator coupled to color demodulators without going through any phase shift means as used in a conventional system, so that the external components and phase adjustment to set the demodulation axis can be eliminated.

In a practical embodiment of the circuit of FIG. 6, the components used had the following values:

| | |
|---|---|
| Resistor **73** | 47 kilohms |
| Resistor **76***b* | 15 kilohms |
| Resistor **78***b* | 330 ohms |
| Resistor **84** | 10 kilohms |
| Resistor **87***a* | 18 kilohms |
| Resistor **87***b* | 1 kilohm |
| Resistor **97** | 56 kilohms |
| Resistor **102** | 47 kilohms |
| Resistor **120** | 1.5 kilohms |
| Resistor **121** | 1 kilohm |
| Capacitor **71** | 0.01 microfarad |
| Capacitor **76***a* | 12 picofarads |
| Capacitor **78***a* | 68 picofarads |
| Capacitor **80** | 0.01 microfarad |
| Capacitor **81** | 0.01 microfarad |
| Capacitor **82** | 0.01 microfarad |
| Capacitor **83** | 0.01 microfarad |
| Capacitor **86** | 0.001 microfarad |
| Capacitor **88***a* | 1 microfarad |
| Capacitor **88***b* | 0.1 microfarad |
| Capacitor **90** | 100 picofarads |
| Capacitor **101** | 10 picofarads |
| Capacitor **122** | 18 picofarads |
| Capacitor **129** | 0.01 microfarad |
| Capacitor **130** | 0.01 microfarad |
| Potentiometer **96** | 5 kilohms |
| Potentiometer **98** | 5 kilohms |
| Voltage variable capacitance diode **91** | GW-11 |
| Crystal **92** | HC-61W |
| Diode **79** | BAX13 |

The Transistors used were:

Transistors 50, 51*a*, 51*b*, 52*a*, 52*b*, 53*a*, 53*b*, 54*a*, 54*b*, 55*a*, 55*b*, 56*a*, 56*b*, 57 and 58 - - - NPN silicon transistors.

Transistors 61, 62, 63 and 64 - - - PNP silicon transistors.

The integrated circuits used were:

| | |
|---|---|
| IC **201** | M5340 |
| IC **202** | μPB 213C |
| IC **203** | AN 227 |

The voltage values of power supply sources used were:

| | |
|---|---|
| $V_1$ | 15 volts |
| $V_2$ | 6 volts |
| $V_3$ | 3 volts |
| $V_4$ | −3 volts |

It will be obvious that many modifications of the specific embodiments shown may be made without departing from the spirit and scope of this invention. For example, while the crystal pulse generator composed of gate circuits and a voltage controlled variable capacitance diode is shown in the embodiment of the invention, many different means, such as a sine wave oscillator or an astable multivibrator, and other variable reactance means, such as a reactance transistor circuit, could be used in the described sub-carrier regenerator. It is contemplated, therefore, by the appended claims, to cover any such modifications as fall within the spirit and scope of this invention.

What is claimed is:

1. A color sub-carrier reference system for use in a color television receiver having a color burst separating means and a first chroma demodulating means and a second chroma demodulating means, comprising:

a signal generating means coupled to the burst separating means for providing output signals having polarities opposite to each other and the second harmonic or double the frequency of the sub-carrier;

first flip-flop means which is coupled to said signal generating means and driven by the first output signal of said signal generating means and which provides a first reference signal to the first chroma demodulating means; and a second flip-flop means which is coupled to said signal generating means and driven by the second output signal having the phase opposite to that of said first output signal of said signal generating means and which provides a second reference signal to the second chroma demodulating means.

2. A color sub-carrier reference system as claimed in claim 1 wherein said signal generating means comprises:

a first phase error detecting means which is connected between said burst separating means and said first flip-flop means and which develops a control signal by measuring the phase difference between the burst and said first reference signal;

a voltage controlled oscillating means coupled to said phase error detecting means, said oscillating means oscillating at the second harmonic or double the frequency of the sub-carrier and being controlled by said control signal;

a phase inverting means which is coupled to said voltage controlled crystal oscillating means and provides a signal having a phase opposite to that of the output signal of said voltage controlled oscillating means; and a waveform adjusting means coupled to said voltage controlled oscillating means for maintaining the duty factor of the waveform of the generated signal at one-half.

3. A color sub-carrier reference system as claimed in claim 2 wherein said signal generating means further comprises a sample-hold means connected between said first phase error detecting means and said voltage controlled oscillating means, said sample-hold means comprising a charging capacitor and sampling the output signal of said first phase error detecting means and holding a sampled signal in said charging capacitor during a line scan interval.

4. A color sub-carrier reference system as claimed in claim 1 wherein said signal generating means comprises:

a first phase error detecting means which is connected between said burst separating means and said first flip-flop means, and which develops a control signal by measuring the phase difference between the burst signal and said first reference signal;

a voltage controlled oscillating means coupled to said first phase error detecting means, said oscillating means oscillating at the 4Nth harmonic or 4N times the frequency of the sub-carrier and being controlled by said control signal;

a frequency dividing means coupled to said voltage controlled oscillating means for dividing the oscillating frequency by N; and a third flip-flop means coupled to said frequency dividing means for providing opposite polarity signals, the frequency of which is the second harmonic or double the frequency of the sub-carrier.

5. A color sub-carrier reference system as claimed in claim 4 wherein said N of said signal generating means is and integer.

6. A color sub-carrier reference system as claimed in claim 4 wherein said signal generating means further comprises a sample-hold means connected between said first phase error detecting means and said voltage controlled oscillating means, said sample-hold means comprising a charging capacitor and sampling the output signal of said first phase detecting means and holding a sampled signal in said charging capacitor during a line scan interval.

7. A color sub-carrier reference system as claimed in claim 6 wherein said sample-hold means comprises:

an envelope detecting means which is coupled to said burst separating means and which develops an envelope signal of the burst;

a first pulse-forming means which is coupled to said envelope detecting means and which provides a pulse signal;

a sampling switch coupled to said first pulse-forming means and driven by the pulse signal therefrom;

a charging capacitor coupled to said first phase error detecting means through said sampling switch;

a line sweep circuit;

a second pulse-forming means coupled to said line sweep circuit and which provides a pulse signal; and a discharging switch connected in parallel with said charging capacitor and to said second pulse-forming means and being driven by the pulse signal therefrom at the end of a line scan interval.

8. A color sub-carrier reference system as claimed in claim 1 further comprising a second phase error detecting means connected between said burst separating means and said second flip-flop means, and which provides a reset signal to said second flip-flop means.

* * * * *